US011128655B2

(12) United States Patent
   S

(10) Patent No.: US 11,128,655 B2
(45) Date of Patent: Sep. 21, 2021

(54) METHOD AND SYSTEM FOR MANAGING SECURITY VULNERABILITY IN HOST SYSTEM USING ARTIFICIAL NEURAL NETWORK

(71) Applicant: Wipro Limited, Bangalore (IN)

(72) Inventor: Ajith Kumar S, Chennai (IN)

(73) Assignee: Wipro Limited, Bangalore (IN)

( * ) Notice: Subject to any disclaimer, the term of this patent is extended or adjusted under 35 U.S.C. 154(b) by 169 days.

(21) Appl. No.: 16/662,461

(22) Filed: Oct. 24, 2019

(65) Prior Publication Data
   US 2021/0075816 A1    Mar. 11, 2021

(30) Foreign Application Priority Data
   Sep. 6, 2019  (IN) .............................. 201941035953

(51) Int. Cl.
   *H04L 29/06*  (2006.01)
   *G06N 3/04*   (2006.01)
(52) U.S. Cl.
   CPC ....... *H04L 63/1433* (2013.01); *G06N 3/0454* (2013.01)
(58) Field of Classification Search
   None
   See application file for complete search history.

(56) References Cited

U.S. PATENT DOCUMENTS

| 9,680,855 B2* | 6/2017 | Schultz ............. G06Q 10/0635 |
| 10,313,389 B2* | 6/2019 | Hovor ................. H04L 63/1433 |
| 10,757,127 B2* | 8/2020 | Schultz .................. H04L 63/14 |

(Continued)

FOREIGN PATENT DOCUMENTS

KR    10-2018-0127221    11/2018

OTHER PUBLICATIONS

A. R. Khan, S. M. Bilal and M. Othman, "A performance comparison of open source network simulators for wireless networks," 2012 IEEE International Conference on Control System, Computing and Engineering, 2012, pp. 34-38, doi: 10.1109/ICCSCE.2012.6487111. (Year: 2012).*

(Continued)

*Primary Examiner* — Jeffery L Williams
(74) *Attorney, Agent, or Firm* — Finnegan, Henderson, Farabow, Garrett & Dunner, LLP

(57) ABSTRACT

This disclosure relates to method and system for managing security vulnerability in a host computer system. In an embodiment, the method may include receiving reputation data with respect to external network traffic data and receiving intrusion data with respect to host system data. The intrusion data may be generated by the host computer system based on the external network traffic data. The method may further include generating a plurality of test cases based on the reputation data and the intrusion data. The test cases, upon simulation, may provide information with respect to security vulnerability in the host computer system. The method may further include determining a set of implementable topologies for the host computer system, based on a simulation of each of the plurality of test cases, using a first artificial neural network (ANN) model to manage the security vulnerability.

20 Claims, 6 Drawing Sheets

(56) References Cited

U.S. PATENT DOCUMENTS

| | | | |
|---|---|---|---|
| 2004/0059947 A1* | 3/2004 | Lee | H04L 63/1466 726/23 |
| 2008/0072321 A1* | 3/2008 | Wahl | H04L 63/14 726/22 |
| 2014/0344933 A1 | 11/2014 | Huh et al. | |
| 2015/0106310 A1* | 4/2015 | Birdwell | G06N 3/049 706/20 |
| 2015/0227404 A1* | 8/2015 | Rajagopal | G06F 11/0784 714/37 |
| 2018/0004948 A1 | 1/2018 | Martin et al. | |
| 2018/0337938 A1 | 11/2018 | Kneib et al. | |
| 2018/0367563 A1* | 12/2018 | Pfleger de Aguiar | H04L 41/12 |
| 2020/0045069 A1* | 2/2020 | Nanda | G06N 5/025 |
| 2020/0403991 A1* | 12/2020 | Sohail | G06F 1/28 |
| 2021/0075816 A1* | 3/2021 | S | G06F 21/577 |

OTHER PUBLICATIONS

Thamilarasu, Geethapriya, and Shiven Chawla. "Towards Deep-Learning-Driven Intrusion Detection for the Internet of Things." Sensors (Basel, Switzerland) vol. 19,Sep. 1977. Apr. 27, 2019, doi: 10.3390/s19091977 (Year: 2019).*

Shenfield, A., "Intelligent intrusion detection systems using artificial neural networks," ICT Express 4 (2018) pp. 95-99.

Igor, H. et al, "Application of Neural Networks in Computer Security," Procedia Engineering 69 (2014) pp. 1209-1215.

* cited by examiner

METHOD AND SYSTEM FOR MANAGING SECURITY VULNERABILITY IN HOST SYSTEM USING ARTIFICIAL NEURAL NETWORK

This application claims the benefit of Indian Patent Application Serial No. 201941035953 filed Sep. 6, 2019, which is hereby incorporated by reference in its entirety.

FIELD

This disclosure relates generally to computer security, and more particularly to managing security vulnerability in a host computer system using an artificial neural network (ANN).

BACKGROUND

Security information and event management (SIEM) is an approach to security management that combines SIM (security information management) and SEM (security event management) functions into one system. The underlying principles of every SIEM system is to aggregate relevant data from multiple sources, identify deviations from the norm, and take appropriate action. However, with the increasing security breaches, it is essential to provide a robust system that is capable of identifying breaches and offences in the network and reduce the occurrences of false positives.

Conventional security systems are typically static in nature and, therefore, limited in their scope and application. For example, conventional security systems may not be synchronous with the threats of the contemporary world as learning of such systems is typically derived from an outdated set of knowledge base, which has potential for returning a wrong result. Further, conventional security systems may not differentiate correctly between whether a security incident is actually a threat or one that masquerades as a threat. Additionally, rules employed by endpoint security modules in the conventional security systems so as to trigger offences/alerts are not dynamically updated. For example, if the Internet Protocols (IPs) are malicious and an offense got triggered in the endpoint security module in the first attempt, the attacker may simply replicate the same offence with an authentic IP. In other words, if the rules are not defined dynamically or if the endpoint security modules do not learn, there may be shortcomings on the effectiveness of STEM on integration with an endpoint security. Further, there may be considerable wastage of resources due to identification of abnormal number of false positives. One of the key aspects of an ideal SIEM system is to minimize the number of false positives.

SUMMARY

In one embodiment, a method for managing security vulnerability in a host computer system is disclosed. In one example, the method may include receiving reputation data with respect to external network traffic data and intrusion data with respect to host system data. The intrusion data may be generated by the host computer system based on the external network traffic data. The method may further include generating a plurality of test cases based on the reputation data and the intrusion data. The test cases, upon simulation, may provide information with respect to security vulnerability in the host computer system. The method may further include determining a set of implementable topologies for the host computer system, based on a simulation of each of the plurality of test cases, using a first artificial neural network (ANN) model to manage the security vulnerability.

In one embodiment, a host computer system is disclosed. In one example, the host computer system may include at least one processor and a memory communicatively coupled to the at least one processor. The memory may store processor-executable instructions, which, on execution, may cause the processor to manage security vulnerability in the host computer system. In particular, the processor-executable instructions, on execution, may cause the processor to receive reputation data with respect to external network traffic data and intrusion data with respect to host system data. The intrusion data may be generated by the host computer system based on the external network traffic data. The processor-executable instructions, on execution, may further cause the processor to generate a plurality of test cases based on the reputation data and the intrusion data. The test cases, upon simulation, may provide information with respect to security vulnerability in the host computer system. The processor-executable instructions, on execution, may further cause the processor to determine a set of implementable topologies for the host computer system, based on a simulation of each of the plurality of test cases, using a first artificial neural network (ANN) model to manage the security vulnerability.

In one embodiment, a non-transitory computer-readable medium storing computer-executable instructions for managing security vulnerability in a host computer system is disclosed. In one example, the stored instructions, when executed by a processor, may cause the processor to perform operations including receiving reputation data with respect to external network traffic data and intrusion data with respect to host system data. The intrusion data may be generated by the host computer system based on the external network traffic data. The operations may further include generating a plurality of test cases based on the reputation data and the intrusion data. The test cases, upon simulation, may provide information with respect to security vulnerability in the host computer system. The operation may further include determining a set of implementable topologies for the host computer system, based on a simulation of each of the plurality of test cases, using a first artificial neural network (ANN) model to manage the security vulnerability.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
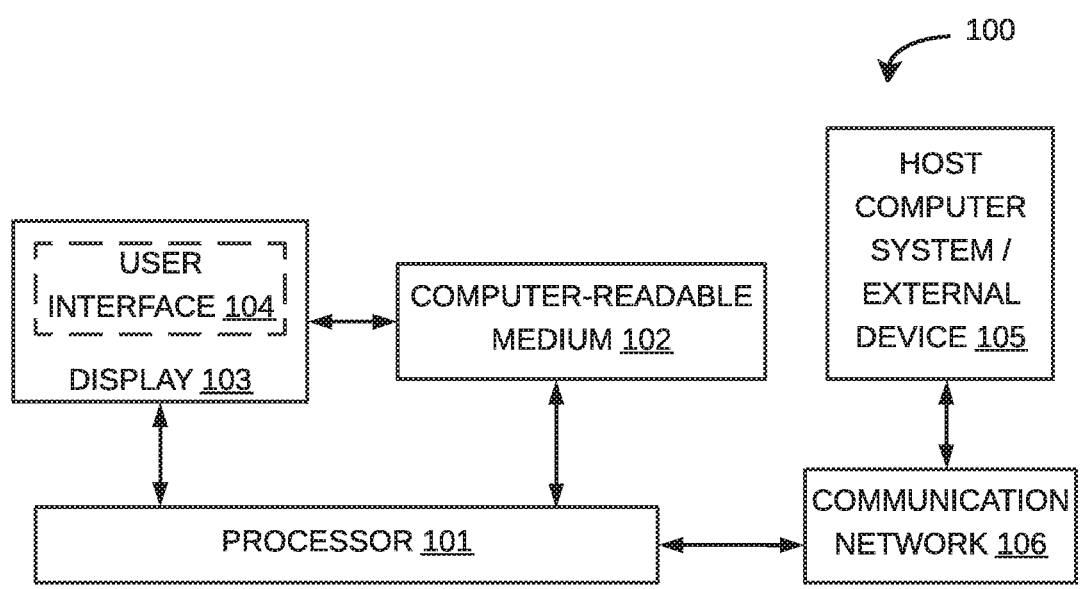
FIG. 1 is a block diagram of an exemplary security system for managing security vulnerability using an artificial neural network (ANN) model, in accordance with some embodiments of the present disclosure.

Referring now to FIG. 1, a block diagram of an exemplary security system 100 for managing security vulnerability in a host computer system is illustrated, in accordance with some embodiments of the present disclosure. In particular, the system 100 may implement a host security device for managing security vulnerability in the host computer system using an artificial neural network (ANN) model. The security system 100 may take the form of any computing device (for example, server, desktop, laptop, notebook, netbook, tablet, smartphone, mobile phone, or the like) that may implement the host security device.

As will be described in greater detail in conjunction with FIGS. 2-5, the host security device may receive reputation data with respect to external network traffic data and intrusion data with respect to host system data. The intrusion data may be generated by the host computer system based on the external network traffic data. Further, the host security device may generate a plurality of test cases based on the reputation data and the intrusion data. The test cases, upon simulation, may provide information with respect to security vulnerability in the host computer system. Further, the host security device may determine a set of implementable topologies for the host computer system, based on a simulation of each of the plurality of test cases, using a first ANN model. The set of implementable topologies may manage the security vulnerability in the host computer system.

The security system 100 may include one or more processors 101 and a computer-readable medium (for example, a memory) 102. In some embodiments, the security system 100 may also include a display 103. The computer-readable storage medium 102 may store instructions that, when executed by the one or more processors 101, cause the one or more processors 101 to manage security vulnerability in the host computer, in accordance with aspects of the present disclosure. The computer-readable storage medium 102 may also store various data (for example, external network traffic data, reputation data, intrusion data, anti-malware application data, host system data, test cases, set of implementable topologies, recommended implementable topology, various ANN models, various knowledge bases, set of security rules, and the like) that may be captured, processed, and/or required by the security system 100. The security system 100 may interact with a user via a user interface 104 accessible via the display 103. The security system 100 may also interact with one or more host computer systems or external devices 105 over a communication network 106 for sending or receiving various data. The host computer systems or external devices 105 may include, but may not be limited to, a (remote) server, a desktop, a laptop, a digital device, or another computing system.

Figure 2:
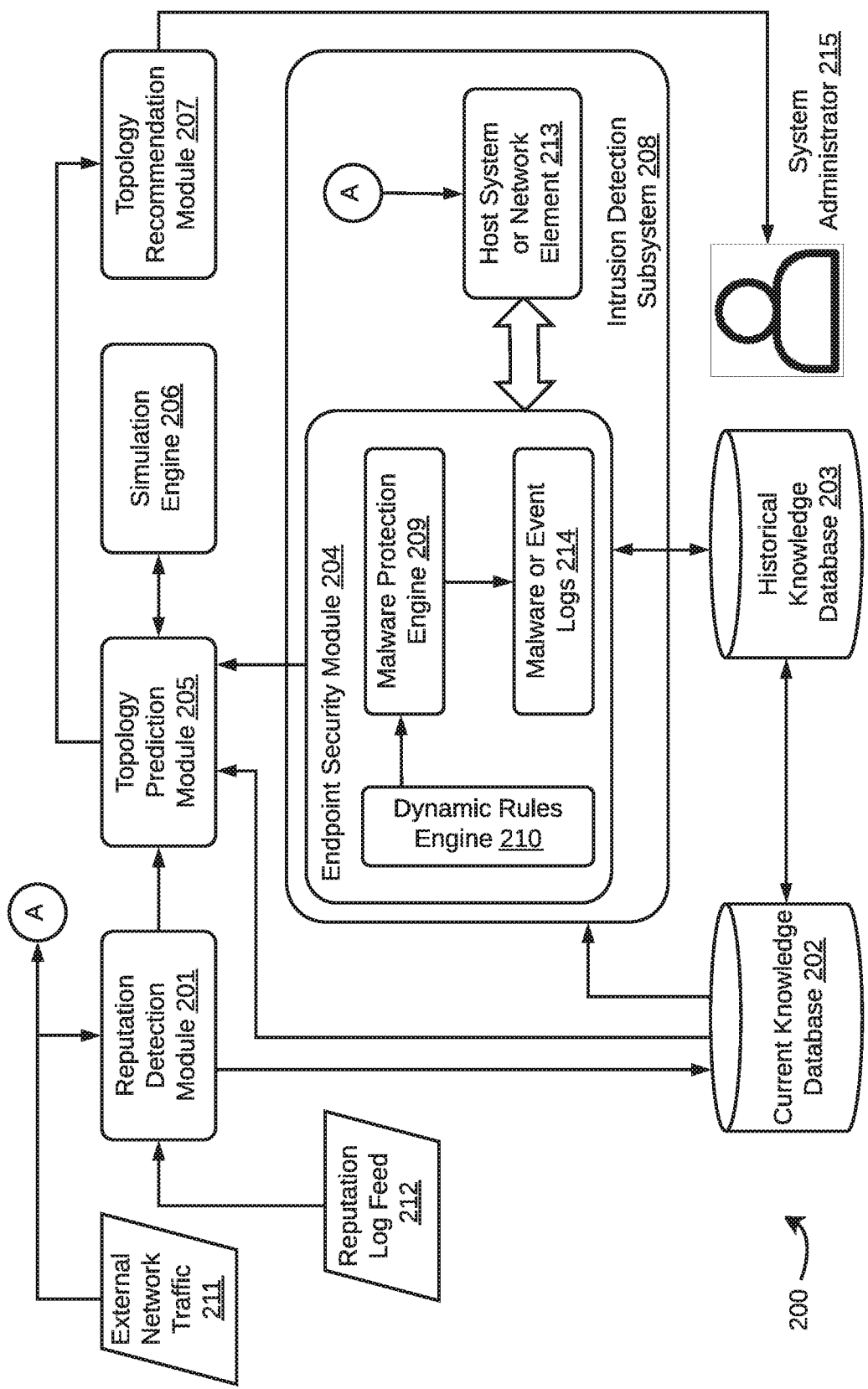
FIG. 2 is a functional block diagram of a security device implemented by the exemplary security system of FIG. 1, in accordance with some embodiments of the present disclosure.

Referring now to FIG. 2, a functional block diagram of a host security device 200 implemented by the system 100 is illustrated, in accordance with some embodiments of the present disclosure. The host security device 200 may include a reputation detection module 201, a current knowledge database 202, a historical knowledge database 203, an endpoint security module 204, a topology prediction module 205, a simulation engine 206, and a topology recommendation module 207. It should be noted that the endpoint security module 204 may be a part of the intrusion detection subsystem 208 and may further include malware protection engine 209 and dynamic rules engine 210. As will be appreciated by those skilled in the art, all such aforementioned modules and engines may be represented as a single module or a combination of different modules. Moreover, as will be appreciated by those skilled in the art, each of the modules, engines, and databases may reside, in whole or in parts, on one device or multiple devices in communication with each other.

As will be described in detail below, the host security device 200 is capable of detecting and handling security breaches in a secured network having the presence of an intrusion detection system 208 (e.g., anti-virus and/or similar mechanisms) which may include Firewalls. The host security device 200 may receive data 201 entering the secured network as feed and may provide the same to various reputation sites for determination of the IP's reputation using reputation detection module 201. The received information may be stored in the current knowledge database 202 while the output of the reputation detection module 201 may be provided to the topology prediction module 205. The data in the current knowledge database 202 and the historical knowledge database 203 may be provided to the dynamic rules engine 210, which may then dynamically derive new rules or update old rules based on the update that takes place in the current knowledge database 202. For example, the dynamic rule engine 210 may add reputation details of new IPs or update the topology. The endpoint security module 204 may provide the set of new/updated rules and malware/event logs 214 (from the malware protection engine 209) to the topology prediction module 205. The topology prediction module 205 may then amalgamate the input received from the reputation detection module 201 and the endpoint security module 204 to generate topologies that would be most successful in handling the type of data that has entered the network. It should be noted that the topology prediction module 205 may also correlate data from the historical knowledge database 203 and the current knowledge database 202 to determine strategies to prevent security breach and handing any security offence. The entire security device 200 may be implemented by means of ANN.

The reputation detection module 201 may receive the data that enters the secured network (i.e., the host computer system 213 or network device pertaining to the host computer system 213). In particular, the reputation detection module 201 may receive external network traffic 211, which may include generic/malicious traffic from different sources. The received data may be scrutinized to determine the authenticity of the packets/data that tries to enter the host computer system 213. The received data may be provided to multiple reputation sites, which provide feedback (i.e., feeds) 212 with respect to the authenticity of the IP from which the data originates. The log feeds 212 from multiple reputation sites (including third-party reputation sites) may help in detecting whether the External IP is truly malicious or not.

In some embodiments, the raw feedback 212 received from multiple reputation sites may be received from multiple layers wherein each reputation site may serve as a layer. The output received from the layers may be analyzed and weights assigned to each layer accordingly. It should be noted that this is the learning phase for the security device, wherein the feeds 212 from different reputation sites are provided as neural signals and the weights for which are either assigned manually or learned using the ANN. As will be discussed in greater detail below, the ANN may employ back propagation algorithm for the learning. For example, different organizations may hold weightage for various reputation sites in which case manual set of weights maybe assigned to the layer of neurons.

The analyzed data may be mapped to the historical data to understand the differentiation between the previously detected offences and the present offences. The reputation detection module 201 may also perform determination of vulnerability signatures, packet permits, and other indication of compromises (IOC), each of which in turn form layers of the ANN. The cumulative layers may provide the IP reputation comprehensively and is learned from the data of signature intrusion as well as IP reputations from sites. This provide a comprehensive assessment as to whether the IPs trying to access the network are safe or malicious. The aforementioned data may be analysed to obtain the actual state of the data that enters the host computer system 213 so as to determine whether the data entering the host computer system 213 is authentic or not. The analysed data may then be provided to the current knowledge database 202 and the topology prediction module 205 for subsequent use and processing. For example, after the learning has been inculcated through ANN, the learned data may be stored in the current knowledge database 202. Similarly, the analysed data may be provided to the topology prediction module 205 to determine a robust topology.

By way of an example, weightage may be assigned to a detected IP as follows. If a particular IP is considered malicious in IBM XFORCE EXCHANGE, so the neuron may trigger with a value (say, 8), which may be then multiplied with given weights to generate an output. The output is then correlated with the signatures from from the Firewall or intrusion prevention system (IPS) (whichever network security device is integrated to it and then the subsequent learned data).

The current knowledge database 202 may receive data from the reputation detection module 201 and the end point security module 204. The received data may include information such as IP signatures, vulnerabilities of the host computer system 213 in the form of depleted topologies (i.e. the topology for which the intrusion has occurred), the reputation of various IP sources, updated rules, actions taken by security device to prevent previous vulnerabilities, and topology layout for reinforcement against any future IP signatures. The historical knowledge database 202 may store information with respect to past intrusions. For example, the historical knowledge database 202 may store information pertaining to security breaches that have occurred in the past, the signature of the such breaches, mode of attack, new anti-malware signatures or trends observed in security breaches, global trends with respect to security breaches, and so forth.

The endpoint security module 204 may receive as input malware or event logs 214 from the malware protection engine 209, data from the current knowledge database 202, as well as data from the historical knowledge database 203. The endpoint security module 204 may then utilize the received data to understand how a packet has crossed the firewall and intruded the host computer system 213 and how the packet is exploiting vulnerability of the network security or host computer security. The endpoint security module 204 may use data from the current knowledge database 202 and the historical knowledge database 203 to device strategies to counter attacks on the security network or the host computer system 213. The endpoint security module 204 may correlate data with the current knowledge database 202 and the historical knowledge database 203 as a two-sided synchronous bus. As will be appreciated, each of the knowledge databases 202 and 203 may perform pre-defined searches on itself and provide the trends on different scenarios. These trends may be later divided based on their respective types of attacks. For example, packet intrusion+vulnerability signatures+suspicious remote IPs+open ports may be interpreted to mean that high severity signatures are allowed by the security device.

By way of an example, a suspicious IP may deploy a malicious data packet into a target network. The endpoint security module 204 may fetch malware/event logs 214 from malware protection engine 209 (e.g., anti-virus engine), data from the current knowledge database 202, and data from the historical knowledge database 203. The endpoint security module 204 may then save the received data as a layer of neurons. It should be noted that the current knowledge database 202 may have its data stored about the IP and the signatures (as the reputation detection module 201 may have stored the details of the packet intrusion as logs from firewall/network component as well as an output). Thus, using the reputation detection module 201, it may be determined if the IP is safe or malicious. Then, the learning may occur using the reputation data as signals and the criticality/priority fetched from the malware/event logs as weights. The output data may then be sent again to the malware protection engine 209 as malicious intrusion. The learned data may be updated in the current knowledge database, thereby helping in mitigating signatures from the suspicious IP in future. The topology prediction module 205 may receive the analyzed data as feeds for generating simulations on the current parameters, and for enunciating a robust topology to protect the network from further intrusion.

The topology prediction module 205 may utilize the data from the current knowledge base 202, the output from the reputation detection module 201, and the output from the endpoint security module 204 to determine if any update in topology is required to counter-act any new comprises that may occur in the host computer system 213. The topology prediction module 205 may receive data from the current knowledge database 202, at regular interval, in form of a new layer of neurons. Similarly, the topology prediction module 205 may receive data from the reputation detection module 201 and the endpoint security module 204. The topology prediction module 205 may then generate test cases based on the received information and data. The topology prediction module 205 may then employ the generated test cases to test the present set of rules so as to determine its effectiveness with respect to security vulnerability of the host computer system 213. In particular, the topology prediction module 205 may determine the output of the test cases by simulating the test cases in the simulation engine 206. In other words, the topology prediction module 205 may provide test for simulation to the simulation engine 206, which may then provide simulated data as output to the topology prediction module 205.

In some embodiments, the simulation engine 206 may handle the errors that may occur during the testing process. In particular, the simulation engine 206 may use a gradient fall process during simulation so as to handle the errors that may occur during the testing process. The topology prediction module 205 may then determine topologies using a vulnerability scanner on the simulation results that have been obtained from the simulation engine 206 based on the test cases. Additionally, the topology prediction module 205 may determine the efficiency of each of the topologies based on different components.

In some embodiments, the topology prediction module 205 may determine new topology based on the output of the test cases by employing an ANN model. It should be noted that the ANN model may employ a learning algorithm such as back propagation algorithm. The output of the test case may serve as signal while the criticality of the vulnerability may serve as weights. Further, in some embodiments, the current knowledge database 202 may synchronize with the topology prediction module 205 for the best network positioning and topologies available. The positioning and trends may be scrutinized as raw routing test cases (the simulations done in network topology prediction) and the learning may be initialized to get the perfect target vector (i.e. the best possible arrangements for which these schematics would excel). Moreover, in some embodiments, the this is achieved by recursive functions called on dynamically using the ANN network.

Figure 3:
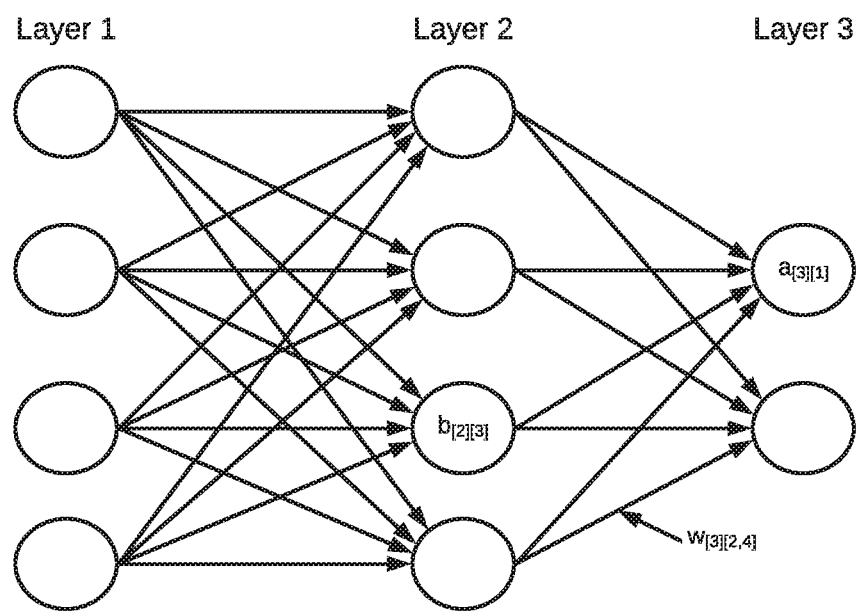
FIG. 3 is an architecture of an ANN model, in accordance with some embodiments of the present disclosure.

By way of an example, an example of the usage of the learning algorithm is described as follows. Referring now to FIG. 3, an architecture of an ANN model employing back propagation algorithm is illustrated, in accordance with some embodiments of the present disclosure. In the illustrated embodiment, $w_{[i][j,k]}$ denotes weight for the connection from the kth neuron in the $(i-1)^{th}$ layer to the $j^{th}$ neuron in the $i^{th}$ layer. Thus, $w_{[3][2,4]}$ is the weight on a connection from the fourth neuron in the second layer to the second neuron in the third layer of a network. Similarly, $b_{[i][j]}$ denotes bias of the $j^{th}$ neuron in the $i^{th}$ layer, and $a_{[i][j]}$ denotes activation of the of the $i^{th}$ neuron in the $i^{th}$ layer. Thus, $b_{[2][3]}$ is the bias of third neuron in the second layer, while $a_{[3][1]}$ is the activation of the first neuron in the third layer. It should be noted that bias provides for direction in which one wants the supervised learning to happen. Similarly, activation $a_{[i][j]}$ of the of the $j^{th}$ neuron in the $i^{th}$ layer is related to the activations in the $(i-1)^{th}$ layer as per equation (1) below:

alj=σ(Σkwjklakl−1+bjl), where the sum is over all neurons kk in the (l−1)th(l−1)th layer.

As discussed above, the error that may occur during the testing process may be handled by a gradient fall process and the tested rules may be processed as statements. The gradient descent is a simple optimization procedure that one may use with many machine learning algorithms. Batch gradient descent may refer to calculating the derivative from all training data before calculating an update.

Referring back to FIG. 2, the simulation engine 206 may receive data (e.g., test cases) from the topology prediction module 205 for simulation. The simulation may entail running of these test cases and generating topologies accordingly. The errors that may have occurred during the testing of the cases may be analyzed to determine the cause of the error. The successfully simulated test cases and the cases which for which errors have occurred may be provided to the topology prediction module 205 for further processing. In particular, the simulation may indicate weak points in the present topology that has led to the occurrence of failures and errors. This information may be provided as output to the topology prediction module 205 for further processing.

The topologies which have been generated by the topology prediction module 205 may be provided to the topology recommendation module 207 for further analysis. Thus, the topology recommendation module 207 may receive data (e.g., topologies and suitability score) from the topology prediction module 205. It utilizes the received data to recommend topologies which are considered effective based on the current state of the security system. In some embodiments, the topology recommendation module 207 may provide the recommendations as output to the user 215 (e.g., system administrator). For example, the user 215 may view and evaluate the recommendations provided by the topology recommendation module 207 via a user interface.

Figure 4:
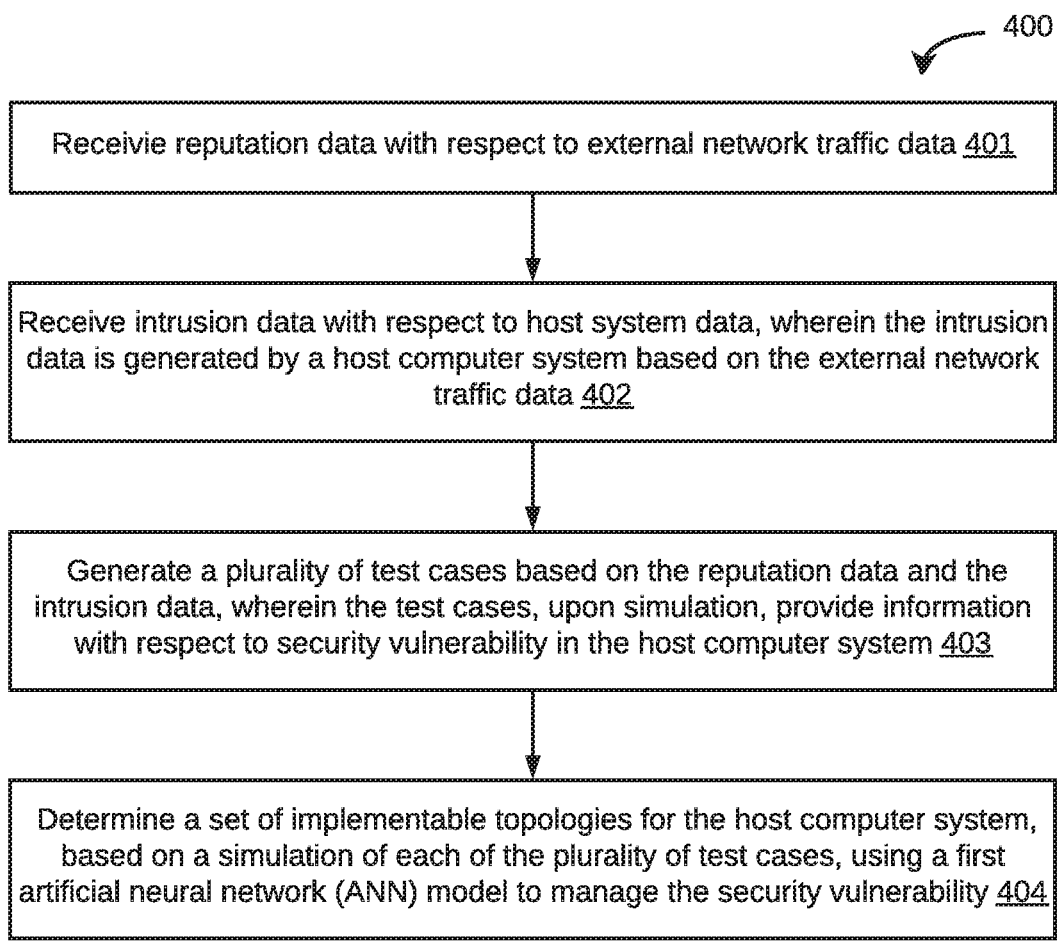
FIG. 4 is a flow diagram of an exemplary process for managing security vulnerability in a host computer system using an ANN model, in accordance with some embodiments of the present disclosure.

Referring now to FIG. 4, exemplary control logic 400 for managing security vulnerability in a host computer system using an ANN model via a system, such as the system 100, is depicted via a flowchart, in accordance with some embodiments of the present disclosure. As illustrated in the flowchart, the control logic 400 may include the steps of receiving reputation data with respect to external network traffic data at step 401 and receiving intrusion data with respect to host system data at step 402. The intrusion data may be generated by a host computer system based on the external network traffic data. The control logic 400 may further include the step of generating a plurality of test cases based on the reputation data and the intrusion data at step 403. The test cases, upon simulation, may provide information with respect to security vulnerability in the host computer system. The control logic 400 may further include the step of determining a set of implementable topologies for the host computer system, based on a simulation of each of the plurality of test cases, using a first artificial neural network (ANN) model to manage the security vulnerability.

In some embodiments, the control logic 400 may further include the step of determining the reputation data by determining authenticity of one or more internet protocols (IPs) from which the external network traffic data originated, using a second ANN model. The reputation data may include at least one of vulnerability signatures, packet permits, or indication of compromises (IOC). Additionally, in some embodiments, the control logic 400 may further include the step of determining the intrusion data based on at least one of anti-malware application data; host system data; or knowledge base with respect to at least one of historical security breaches, current trends in security breaches, or the reputation data. The intrusion data may include at least one of anti-malware logs, event logs, or intrusion activities.

In some embodiments, the test cases are configured to test a set of security rules with respect to managing the security vulnerability. In such embodiments, the control logic 400 may further include the step of dynamically updating, using a third ANN model, the set of security rules based on at least one of historical security breaches, current trends in security breaches, or the reputation data.

In some embodiments, each of the set of implementable topologies may be determined along with a suitability score with respect to managing the security vulnerability. In such embodiments, the control logic 400 may further include the step of providing a recommended implementable topology based on a corresponding suitability score. Additionally, in some embodiments, the control logic 400 may further include the step of determining a recommended implementable topology using a recursive ANN model as the first ANN model.

Figure 5:
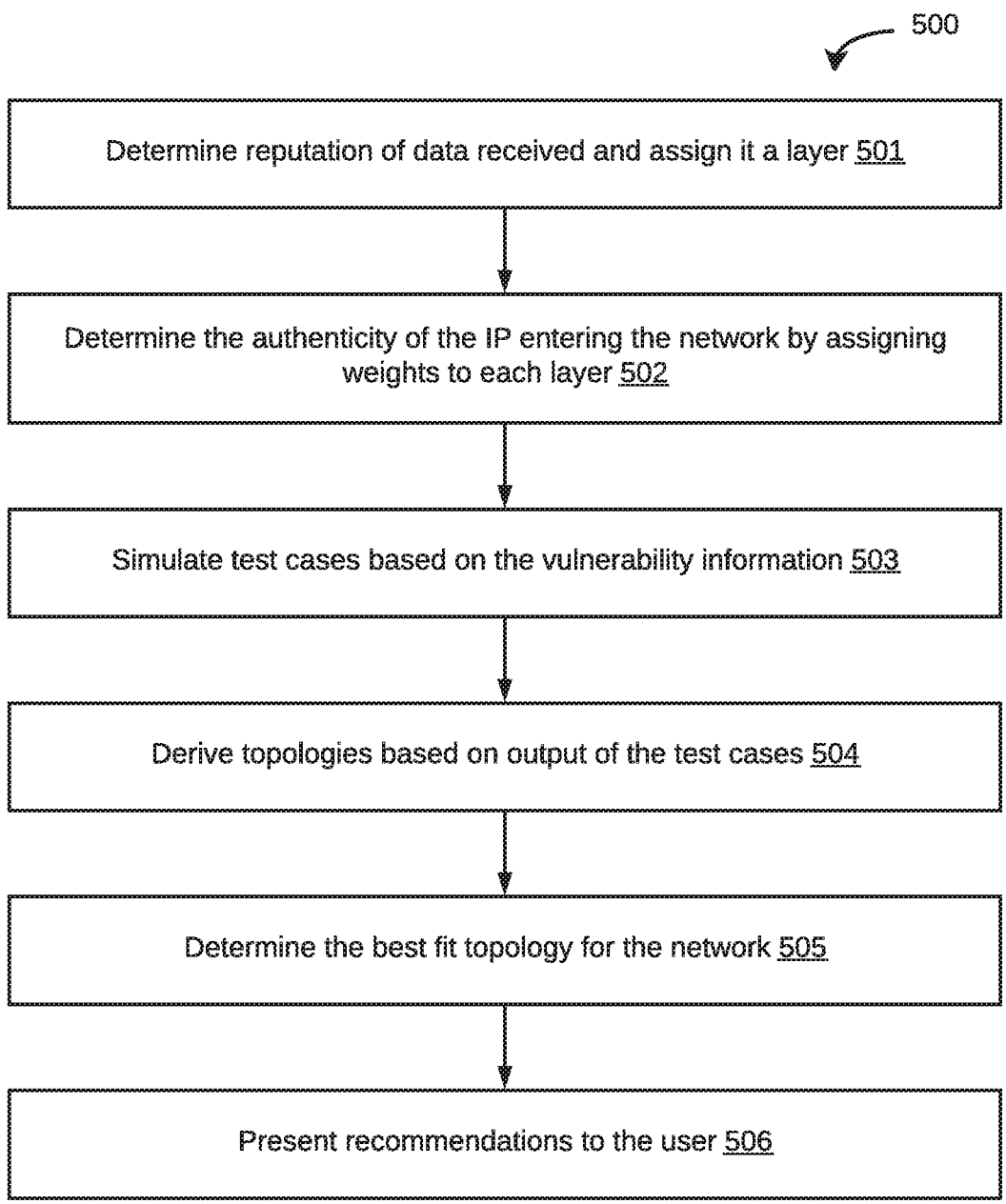
FIG. 5 is a flow diagram of a detailed exemplary process for managing security vulnerability in a host computer system using an ANN model, in accordance with some embodiments of the present disclosure.

Referring now to FIG. 5, exemplary control logic 500 for managing security vulnerability in a host computer system using an ANN model is depicted in greater detail via a flowchart, in accordance with some embodiments of the present disclosure. At step 501, the control logic 500 may determine reputation of data received and assign it a layer. The data entering the network may be scrutinized to determine the reputation of the IP from which the data has been sourced. The reputation of the source may be determined by means of IP reputation data which is received from multiple reputation sites. Further, the reputation data may be assigned as a layer of neurons and the weights of reputational data are assigned based on user requirements.

Further, at step 502, the control logic 500 may determine the authenticity of the IP entering the network by assigning weights to each layer. The reputation detection module 201 may determine the authenticity of the data entering the network by determining vulnerability signatures, packet permits and other indication of compromises (IOC) each of which in turn form layers. For each of these layers, weights may be assigned and cumulative of these layers may provide the authenticity of the data entering the network. It should be noted that the weights of the signatures may be based on the criticality which is procured from the IDS logs. This information may be provided to the current knowledge database 202, the dynamic rules engine 210, and the topology prediction module 205.

Further, at step 503, the control logic 500 may simulate test cases based on the vulnerability information. Based on the reputation data received from the reputation detection module 201, data received from the current knowledge database 202, and the antivirus event logs received from the endpoint security module 204, the topology prediction module 205 may generate test cases, which may be executed to determine the vulnerability of the network that would allow entry of malicious data. The test cases are provided to the simulation engine 206 for processing. The output of the simulated test cases is provided to the topology prediction module 205 for further processing.

Further, at step 504, the control logic 500 may derive topologies based on output of the test cases. The output of the simulated test cases may be derived by means of a vulnerability scanner to determine the magnitude of vulnerability of the network against intrusions. The topology prediction module 205 may then use the determined output for determining the topologies of the network that would be most robust against any unforeseen breaches/intrusions of the network. The output generated may facilitate in determining new topology by means of a learning algorithm wherein the output serves as signal while the criticality of the vulnerability serves as weights.

Further, at step 505, the control logic 500 may determine the best fit topology for the network. The generated topologies may be stored in the form of tables in the current knowledge database 202. These topologies ensure that defense against security intrusions are active and evolving. The output of the same may be rendered to the user/administrator as recommendations by the topology recommendation module 207. To determine the best fit topology, the topology recommendation module 207 may initialize a learning to get a highly rated target vector (i.e., best suited arrangements for which these schematics would excel). This may be achieved by recursive functions called on dynamically using the ANN network.

Further, at step 506, the control logic 500 may present recommendations to the user. The topology which has been selected as the best fit to address the intrusions/breaches to the network (i.e., the topology with a highest suitability score) may be recommended to the user. Based on the changes in the traffic that enters the network, the recommendation may change as the topology presently implemented by the security systems may be reanalyzed for determining vulnerability.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
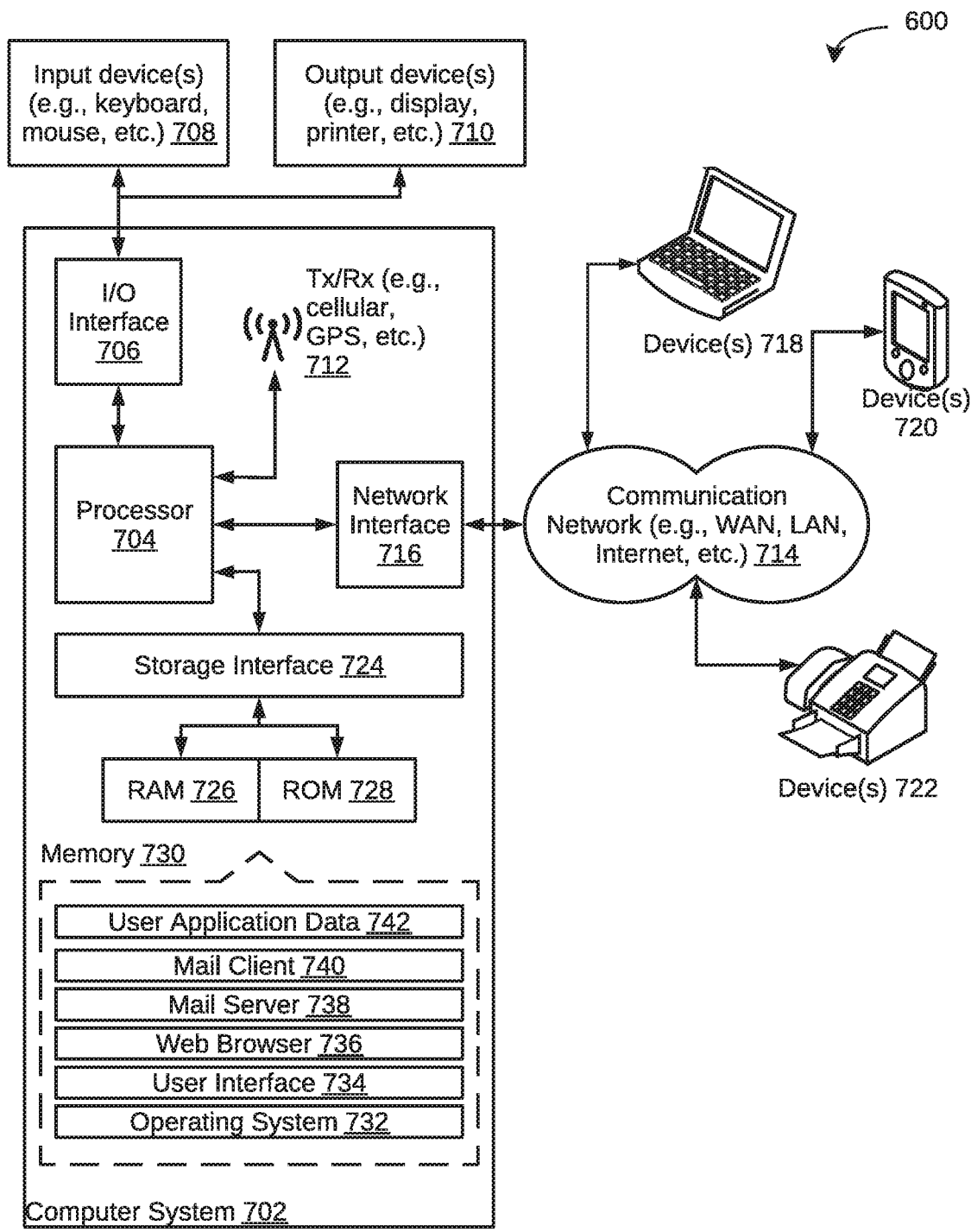
FIG. 6 is a block diagram of an exemplary computer system for implementing embodiments consistent with the present disclosure.

Referring now to FIG. 6, a block diagram of an exemplary computer system 602 for implementing various embodiments is illustrated. Computer system 602 may include a central processing unit ("CPU" or "processor") 604. Processor 604 may include at least one data processor for executing program components for executing user or system-generated requests. A user may include a person, a person using a device such as those included in this disclosure, or such a device itself. Processor 604 may include specialized processing units such as integrated system (bus) controllers, memory management control units, floating point units, graphics processing units, digital signal processing units, etc. Processor 604 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), highspeed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 610 may be a printer, fax machine, video display (for example, cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (for example, using Wireless Application Protocol), the Internet, etc. Using network interface 616 and communication network 614, computer system 602 may communicate with devices 618, 620, and 622. These devices 618, 620, and 622 may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® e-reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 602 may itself embody one or more of these devices 618, 620, and 622.

In some embodiments, processor 604 may be disposed in communication with one or more memory devices (for example, RAM 626, ROM 628, etc.) via a storage interface 624. Storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 630 may store a collection of program or database components, including, without limitation, an operating system 632, user interface application 634, web browser 636, mail server 638, mail client 640, user/application data 642 (for example, any data variables or data records discussed in this disclosure), etc. Operating system 632 may facilitate resource management and operation of computer system 602. Examples of operating systems 632 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 634 may facilitate display, execution, interaction, manipulation, or operation of program components through textual or graphical facilities. For example, user interfaces 634 may provide computer interaction interface elements on a display system operatively connected to computer system 602, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 602 may implement a web browser 636 stored program component. Web browser 636 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers 636 may utilize facilities such as AJAX, DHTML, ADOBE® FLASH® platform, JAVASCRIPT® programming language, JAVA® programming language, application programming interfaces (APIs), etc. In some embodiments, computer system 602 may implement a mail server 638 stored program component. Mail server 638 may be an Internet mail server such as MICROSOFT® EXCHANGE® mail server, or the like. Mail server 638 may utilize facilities such as ASP, ActiveX, ANSI C++/C#, MICROSOFT.NET® programming language, CGI scripts, JAVA® programming language, JAVASCRIPT® programming language, PERL® programming language, PHP® programming language, PYTHON® programming language, WebObjects, etc. Mail server 638 may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement a mail client 640 stored program component. Mail client 640 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 602 may store user/application data 642, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The security systems described in various embodiments discussed above provide for multi-layered identification of threats, reduction in identification of false positives, and dynamic modification of rules so as to reduce the occurrence of false positives due to outdated rules. The security system implements a quick learning phase to facilitate detection and handling of new and emerging threats. The security systems described in various embodiments discussed above will be immensely useful to security operations center who employs security monitoring tools like STEM for customers, because it will give a broad view of potential security compromises and provide more fortifications to the customer environment in terms of endpoint security.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

For example, many of the existing security systems discuss predicting and characterizing cyber-attacks, detecting source of messages that enter a network, inculcating intrusion detection system (IDS) logs from a virtual machine (VM) integrated cloud to the production console, identifying type of data intrusion using packet inspection and artificial neural networks (ANN), and detecting malicious network traffic using deep packet analysis. However, none of the existing systems disclose dynamic rule definition and decision making that would facilitate an IDS/anti-virus to repel any security breach that may have occurred in the network. Such dynamic rules definition is important to prevent unforeseen breaches such as cases in which packets and IP from which they originate appear non-suspicious but are actually masquerading a benign IP, or cases in which the packets originate from IP that has not been recorded earlier (there are high chances that packets may enter the network before an alert is triggered, thereby compromising entire system). Further, existing security systems lack effective mechanisms for detecting if the threat/breach detected is actually that or is a false positive which may be ignored. For example, existing systems does not provide a mechanism for flagging an apparently legitimate data packet as a malicious packet that the said packet actually is. Additionally, for example, existing systems fail to manage cases in which benign packets may originate from suspicious IP.

In contrast, the security systems described in various embodiments discussed above provide for detection and prevention of security breach in a network, for offence handling, and for accurately detecting and handling false positives that may be detected by an IDS module. In particular, the proposed security system provides for the above by means of dynamic rules definition and decision making. The proposed security system implements dynamic rules definition and decision making by utilizing ANN and layered approach. The proposed security system is interconnected on multiple data-feeds and utilizes a layered approach to detect breach and to detect false positives that may occur. The proposed security system relies on ANN in each layer to analyse a particular compromise/situation. Thus, at each layer, the possibility of the false positives is reduced as the proposed security system retains historical knowledge as well as current knowledge derived from present data entering the network.

The proposed security system probes reputational information of a given IP in IP reputation module. The reputational information may be obtained, in the form of neural signals, from third party reputation sites as well as through feeds from the logs fetched from the firewall. For example, as discussed above, if a particular IP is heavily malicious in IBM XFORCE EXCHANGE, so the neuron may trigger with a value (say, 8) which is then multiplied with given weights to generate an output. The output is then correlated with the signatures from the Firewall/IPS. Thus, the proposed security system not only checks the inbound packets, but also checks the source of packets and updates the same in the knowledge base. In other words, the proposed security system checks for the details of the packets (which is procured from Firewall) and add them as signals for the neurons. The proposed security system switches between manual assigning of weights by user or auto updating of weights, depending on the user's requirement. In either case, the learning takes place with the value of neurons as a prime factor.

Further, the proposed security system includes two knowledge bases: historical knowledge base (a global data pool, which is updated by user periodically to reflects the current security trends) and current knowledge base (stores the data learned by the ANN). It should be noted that all data are stored as data formats which are feasible for easy access. Moreover, Further, the proposed security systems provide for generation of topology which would be best suited for counter-acting on the breaches that may occur into a network based on the data that is entering the network at that point in time. In particular, the topology prediction module utilizes data entering the network, anti-virus/event logs and instruction activities that have been recently observed to develop the new topology that is then recommended to the users.

The specification has described method and a system for managing security vulnerability in a host system using an ANN model. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of managing security vulnerability in a host computer system, the method comprising:
   receiving, by a host security device, reputation data with respect to external network traffic data;
   receiving, by the host security device, intrusion data with respect to host system data, wherein the intrusion data is generated by a host computer system based on the external network traffic data;
   generating, by the host security device, a plurality of test cases based on the reputation data and the intrusion data, wherein the test cases, upon simulation, provide information with respect to security vulnerability in the host computer system; and
   determining, by the host security device, a set of implementable topologies for the host computer system, based on a simulation of each of the plurality of test cases, using a first artificial neural network (ANN) model to manage the security vulnerability.

2. The method of claim 1, further comprising determining the reputation data by determining authenticity of one or more internet protocols (IPs) from which the external network traffic data originated, using a second ANN model.

3. The method of claim 1, wherein the reputation data comprises at least one of vulnerability signatures, packet permits, or indication of compromises (IOC).

4. The method of claim 1, further comprising determining the intrusion data based on at least one of:
   anti-malware application data,
   host system data, and
   knowledge base with respect to at least one of historical security breaches, current trends in security breaches, or the reputation data.

5. The method of claim 1, wherein the intrusion data comprises at least one of anti-malware logs, event logs, or intrusion activities.

6. The method of claim 1, wherein the test cases are configured to test a set of security rules with respect to managing the security vulnerability.

7. The method of claim 6, further comprising dynamically updating, using a third ANN model, the set of security rules based on at least one of historical security breaches, current trends in security breaches, or the reputation data.

8. The method of claim 1, wherein each of the set of implementable topologies is determined along with a suitability score with respect to managing the security vulnerability.

9. The method of claim 8, further comprising providing a recommended implementable topology based on a corresponding suitability score.

10. The method of claim 1, further comprising determining a recommended implementable topology using a recursive ANN model as the first ANN model.

11. A host computer system, comprising:
    at least one processor and a computer-readable medium storing instructions that, when executed by the at least one processor, cause the at least one processor to perform operations comprising:
    receiving reputation data with respect to external network traffic data;
    receiving intrusion data with respect to host system data, wherein the intrusion data is generated by a host computer system based on the external network traffic data;
    generating a plurality of test cases based on the reputation data and the intrusion data, wherein the test cases, upon simulation, provide information with respect to security vulnerability in the host computer system; and
    determining a set of implementable topologies for the host computer system, based on a simulation of each of the plurality of test cases, using a first artificial neural network (ANN) model to manage the security vulnerability.

12. The system of claim 11, wherein the operations further comprise determining the reputation data by determining authenticity of one or more internet protocols (IPs) from which the external network traffic data originated, using a second ANN model.

13. The system of claim 11, wherein the operations further comprise determining the intrusion data based on at least one of:
    anti-malware application data,
    host system data, and
    knowledge base with respect to at least one of historical security breaches, current trends in security breaches, or the reputation data.

14. The system of claim 11, wherein the intrusion data comprises at least one of anti-malware logs, event logs, or intrusion activities, and wherein the reputation data comprises at least one of vulnerability signatures, packet permits, or indication of compromises (IOC).

15. The system of claim 11, wherein the test cases are configured to test a set of security rules with respect to managing the security vulnerability.

16. The system of claim 15, wherein the operations further comprise dynamically updating, using a third ANN model, the set of security rules based on at least one of historical security breaches, current trends in security breaches, or the reputation data.

17. The system of claim 11, wherein each of the set of implementable topologies is determined along with a suitability score with respect to managing the security vulnerability.

18. The system of claim 17, wherein the operations further comprise providing a recommended implementable topology based on a corresponding suitability score.

19. The system of claim 11, wherein the operations further comprise determining a recommended implementable topology using a recursive ANN model as the first ANN model.

20. A non-transitory computer-readable medium having stored thereon, a set of computer-executable instructions causing a computer comprising one or more processors to perform steps comprising:
- receiving reputation data with respect to external network traffic data;
- receiving intrusion data with respect to host system data, wherein the intrusion data is generated by a host computer system based on the external network traffic data;
- generating a plurality of test cases based on the reputation data and the intrusion data, wherein the test cases, upon simulation, provide information with respect to security vulnerability in the host computer system; and
- determining a set of implementable topologies for the host computer system, based on a simulation of each of the plurality of test cases, using a first artificial neural network (ANN) model to manage the security vulnerability.

* * * * *